(12) United States Patent
Forster et al.

(10) Patent No.: US 6,895,226 B1
(45) Date of Patent: May 17, 2005

(54) MULTIMODE TRANSCEIVER CIRCUIT

(76) Inventors: Ian J Forster, 31 Great Cob, Springfield, Chelmsford, Essex (GB), CM1 6LA; Adrian N Farr, The Mill House, Bran End, Stebbing, Dunmow, Essex (GB), CM6 3RS; Norman A Howard, 6 St. Johns Road, Newbury Park, Ilford, Essex (GB), IG2 7BB ( * ) Notice: Subject to any disclaimer, the term of this patent is extended or adjusted under 35 U.S.C. 154(b) by 352 days.

(21) Appl. No.: 10/130,442

(22) PCT Filed: Nov. 17, 2000

(86) PCT No.: PCT/GB00/04397

§ 371 (c)(1),
(2), (4) Date: Sep. 17, 2002

(87) PCT Pub. No.: WO01/36995

PCT Pub. Date: May 25, 2001

(30) Foreign Application Priority Data

Nov. 18, 1999 (GB) .............................................. 9927182

(51) Int. Cl.$^7$ ................................................. H04B 1/40
(52) U.S. Cl. .................... 455/86; 455/343.2; 340/10.33
(58) Field of Search .............................. 455/550.1, 574, 455/78, 79, 84, 86, 87, 343.1, 343.2; 340/10.1, 10.33, 10.34; 342/51

(56) References Cited

U.S. PATENT DOCUMENTS

| 4,163,232 A | 7/1979 | Fitzsimmons |
| 4,541,120 A | 9/1985 | Szabo |
| 5,208,563 A | 5/1993 | Russell et al. |
| 5,245,346 A | * 9/1993 | Nishimura et al. ........... 342/42 |
| 5,596,325 A | 1/1997 | Maas |

FOREIGN PATENT DOCUMENTS

| EP | 0 101 611 A2 | 2/1984 |
| EP | 1189073 A2 * | 3/2002 |
| GB | 2 300 318 A | 10/1996 |

* cited by examiner

*Primary Examiner*—Nguyen T. Vo
(74) *Attorney, Agent, or Firm*—Christensen O'Connor Johnson Kindness PLLC

(57) ABSTRACT

A multimode transceiver circuit comprises a four port coupler of a type which splits a signal applied to one port between two of the other ports. The split signals are phase shifted by a known amount. A first port of the coupler is for receiving a signal and for outputting a signal therefrom. A controllable oscillator is connected to a second port of the coupler and switchable impedances (Schottky diodes) are connected to the remaining ports. A controller is provided for controlling the operation of the oscillator and the impedances to determine the mode of operation of the circuit. In one mode of operation, the oscillator is inoperative and at least one of the impedances is switched to operate as a non-linear impedance such that the circuit detects amplitude-modulation of the signal applied to the first port. In a further mode of operation, the oscillator is operable and both impedances are switched to operate as non-linear impedance elements such that they operate as a mixer to produce an intermediate frequency signal in dependence on the signal applied to the first port. In yet a further mode of operation, the oscillator is operable, and the impedances are switched such that the oscillator frequency appears at the first port for transmission therefrom.

12 Claims, 2 Drawing Sheets

MULTIMODE TRANSCEIVER CIRCUIT

Figure 1:
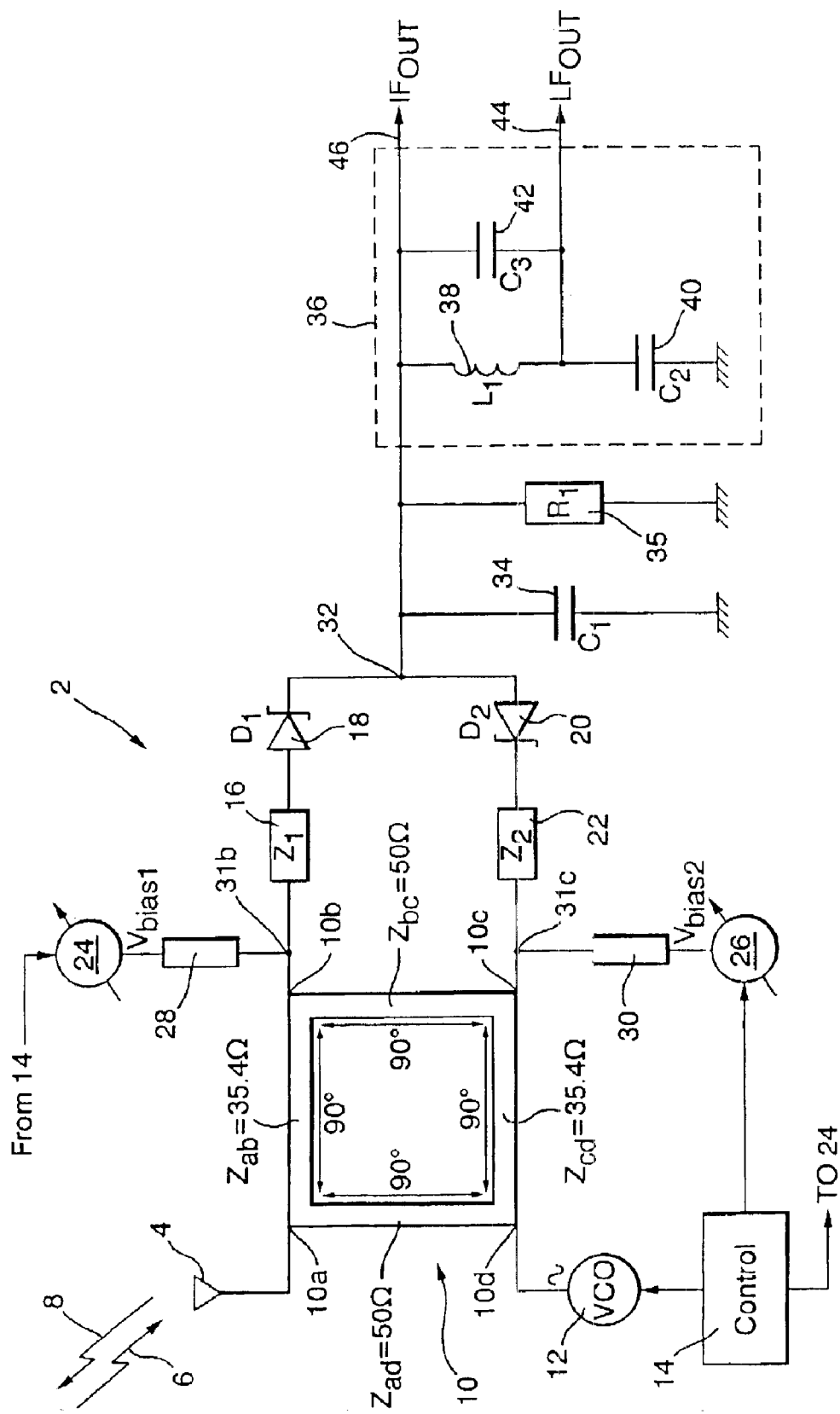

This invention relates to a multimode transceiver circuit and more especially to such a circuit for use in a tagging system.

Tagging systems are well known. They generally comprise one or more interrogator circuits at fixed locations and a number of transponder tags attached to or associated with objects or persons which are mobile. The transponder tags include a transceiver circuit with which the interrogator can communicate typically by means of radio communication. The applications for tagging systems are widespread and include telematics (communication between an infrastructure and vehicles, logistics or electronic manifests, that is, tracking the movement of goods during shipping or transportation) and personal security tags, to name but a few. In all of these applications the transponder circuit, which typically operates at microwave frequencies, is ideally inexpensive and has a long operating life expectancy. To meet the former requires the circuitry to be simple, whilst the latter generally requires the circuit to have a low power consumption and be capable of operating from a battery source.

Transceiver circuits for tags can be "active", that is, they include their own radio transmitter and are able to transmit without the assistance of the interrogator; "purely passive", that is they can be read by an interrogator but cannot themselves talk to the interrogator, or be "semi-passive" sometimes termed "pseudo-passive". A semi-passive transceiver transmits information to the interrogator by reflecting and modulating the signal received from the interrogator. As such, semi-passive transponders do not include an active transmitter and rely solely on the interrogator to provide the communication medium. Semi-passive transceivers are often referred to as reflective modulator type transceivers. Since such transceivers require minimal radio circuitry the transponder tags are compact and have a very low power consumption. Transponder tags based on semi-passive transceivers however have a limited operating range, typically a hundred meteres, and are not therefore suited to long range tagging systems, as required in logistics applications. This is because they are reliant on reflecting the transmitted power from the interrogator, which for long range operation would require the interrogator to operate at unacceptably high power levels. Furthermore the transmission path between the interrogator and transponder tag can often be obstructed which would require yet even greater power levels for reliable operation. In the context of this patent application long range is to be construed as meaning a few hundred meters to 10 km.

For long range tagging systems it is known to use active transceivers. Generally these comprise separate active transmitter and active receiver circuits. Since the tag may only be operable for very short periods of time, for example it may be operable for a few seconds over the course of many weeks or months, it is known to switch the circuit into a low power consumption state (sometimes termed "sleep state") and to re-activate the circuit when a low frequency AM modulated "wake-up" signal is detected. This additionally requires the transceiver to include a separate AM detector circuit. To reduce the circuit complexity it has been proposed to integrate these three circuits within a radio frequency application specific integrated circuit (ASIC). Such circuits however, still have a high power consumption and due to their circuit complexity tend to be expensive. The present invention has arisen in an endeavour to provide a transceiver circuit suitable for use in a long range tagging system which, in part at least, overcomes the limitation of the known transceiver circuits and in particular, although not exclusively, has a lower power consumption and is less expensive than the known transceiver circuits.

According to the present invention a multimode transceiver circuit comprises: a four port coupler of a type which splits a signal applied to one port between two of the other ports, said split signals being phase shifted by a known amount; wherein a first port of the coupler is for receiving a signal and for outputting a signal therefrom: a controllable oscillator connected to a second port of the coupler; switchable impedances connected to the remaining ports; and control means for controlling the operation of the oscillator and impedances; wherein the circuit is operable such that: (a) in one mode of operation the oscillator is inoperative and at least one of said impedances switched to operate as a non-linear impedance such as to detect amplitude modulation of a signal applied to the first port; (b) in a further mode of operation the local oscillator is operable and both impedances switched to operate as non-linear impedance elements such that they operate as a mixer to produce an intermediate frequency signal in dependence on a signal applied to the first port and (c) in yet a further mode of operation the oscillator is operable and the impedances switched such that the oscillator frequency appears at the first port for transmission therefrom.

Preferably the control means controls the switchable impedances by controlling a bias voltage applied thereto. Conveniently the, or each, non-linear impedances comprise a diode and/or a transistor, preferably a FET.

In a preferred arrangement the coupler is a quadrature coupler such that the split signals are phase shifted by zero and ninety degrees. Alternatively the coupler is of a type which phase shifts the split signals by zero and one hundred and eighty degrees. Depending on the intended frequency of operation the coupler circuit can comprise a branch aim, rat race, transformer, ring or waveguide coupler.

Preferably the mode of operation of the circuit is determined by the impedance match or mis-match of the switchable impedance to its respective port. Such an arrangement eliminates the need for separate switching elements to control the operation of the circuit. Advantageously with such a circuit in the yet further mode of operation each impedance is switched such as to present an impedance mismatch to its respective port thereby reflecting the signal from the oscillator to the first port. Preferably the circuit further comprises a fixed impedance element between the port and its respective switchable impedance wherein the impedance of the element is selected such that the switchable impedance is substantially matched to its respective port when it is operated as a nonlinear impedance.

According to a further aspect of the invention a transponder tag incorporates a transceiver circuit as described above.

Figure 2:
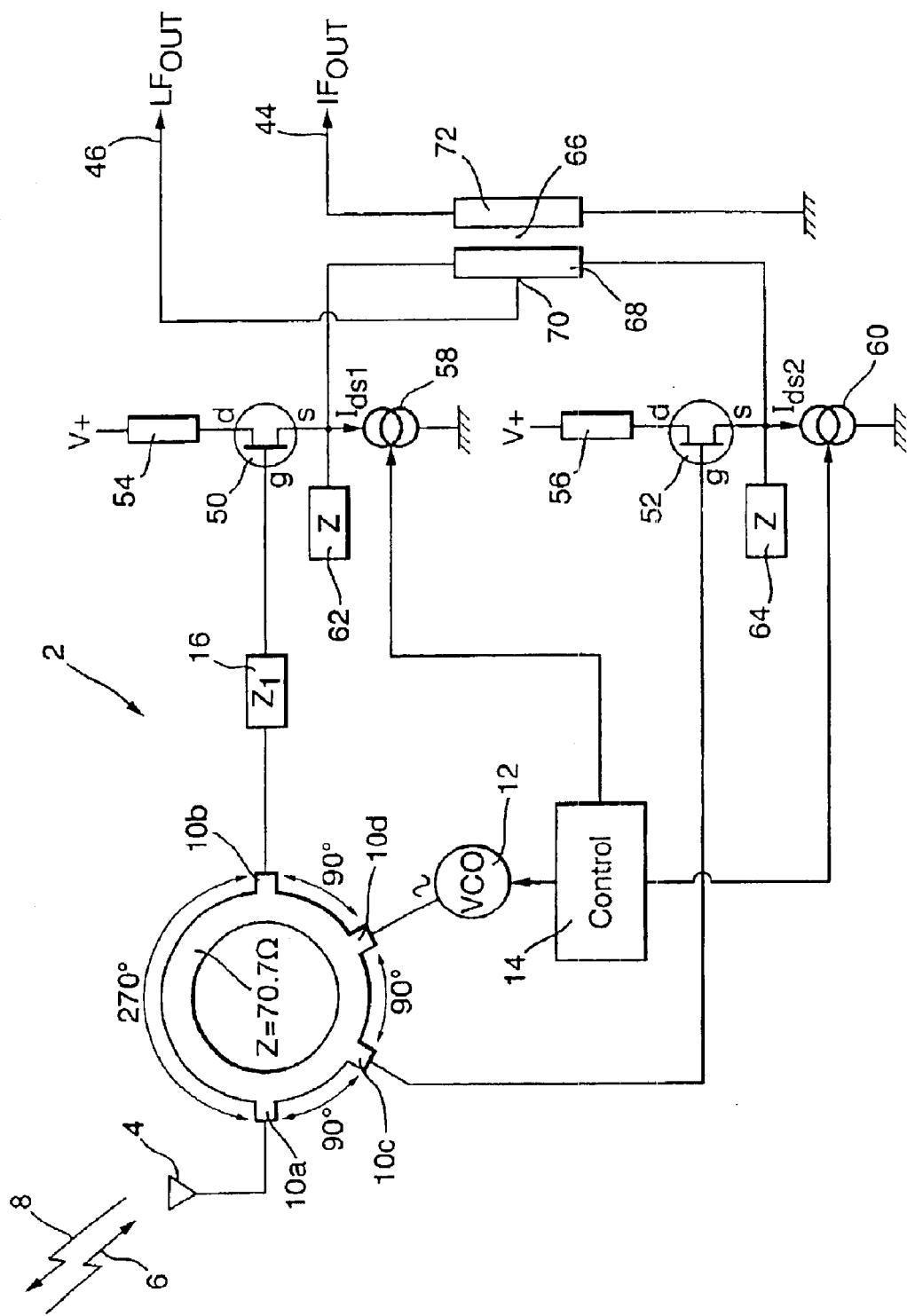

In order that the invention may be better understood two transceiver circuits in accordance with the invention will now be described by way of example only with reference to the accompanying drawings in which:

FIG. 1 is a transceiver circuit in accordance with a first embodiment of the invention; and FIG. 2 is a transceiver circuit in accordance with a second embodiment of the invention.

Referring to FIG. 1 there is shown a 2.45 GHz mulitmode transceiver circuit 2 for use as an RF front end circuit in a manifest tag with a typical operating range of up to 300 m. The transceiver circuit 2 comprises a microwave patch antenna 4 for receiving modulated microwave radiation 6 from an interrogating source (not shown) and for radiating microwave radiation 8 therefrom. The antenna 4 is connected to a first port 10*a* of a quadrature (0°/90°) microwave branch arm hybrid coupler 10.

As is known a hybrid coupler is a four port device having a known set of characteristics namely: (i) that all ports are matched; (ii) radio frequency (RF) power applied to any one port is split equally between two of the other ports; and (iii) the remaining port is isolated (i.e. no output is obtained from it). For a quadrature hybrid coupler the phases between the split signals differs by 90° at the respective outputs regardless of which port the original signal was applied to.

In FIG. 1 the arrows between the four ports 10*a*–d represent the phase delays between them. Thus there is a 90° phase delay between adjacent ports. Thus if a signal is applied to the port 10*a* it is split equally between ports 10*b* and 10*c* with the split signals appearing at these ports having a relative phase difference of 90°. No output appears at the port 10*d*. Likewise if a signal is applied to the port 10*d* this will be equally split between the ports 10*b* and 10*c* and no output appears at the port 10*a*, and so forth. It should be noted that this functionality is reliant on each port being correctly terminated with the characteristic system impedance which is 50 ohms in the embodiment described. Typically the ports are matched such that there return loss is better than −16 dB.

The coupler 10 is preferably constructed using microstrip line in which the characteristic impedance $Z_{ab}$, $Z_{cd}$ of the arms between the ports 10*a*, 10*b* and 10*c*, 10*d* are 35.4 Ω and the characteristic impedance $Z_{bc}$, $Z_{ab}$ of the arms between ports 10*b*, 10*c* and I*a*, 10*d* are 50 Ω.

The transceiver circuit 2 further comprises a voltage controlled oscillator (VCO) 12 connected to the fourth port 10*d* of the hybrid coupler 10. The operation of the VCO 12 is determined by a control circuit 14.

Connected in series between the remaining two ports 10*b* and 10*c* there are, in order, an impedance matching transformer ($Z_1$) 16, a first Schottky diode ($D_1$) 19, a second Schottky diode ($D_2$) 20 and a further impedance matching transformer ($Z_2$) 22. Respective controllable bias voltage sources 24 and 26 are connected via respective transmission line elements 28, 30 to the interconnection 31*b*, 31*c* between the coupler port 10*b*, 10*c* and the respective impedance matching transformer 16, 22. The transmission line elements 28 and 30, which are preferably of microstrip line construction, prevent RF signals reaching the bias voltage generators 24, 26 whilst allowing their d.c. bias voltage $V_{bias1}$ and $V_{bias2}$ to pass.

The interconnection 32 between the diodes 18, 20 provides an output to the circuit. A capacitor ($C_1$) 34, which is preferably in the form of a radial stub, and resistor 35($R_1$) are connected in parallel between the interconnection 32 and ground. The value of the capacitor 34 is selected such that the interconnection 32 is at ground potential in terms of a microwave RF signal. i.e. at 2.45 GHz. The resistor 35 in conjunction with each diode 19, 20 comprises a DC potential divider such that each diode can be DC biased by its respective bias voltage source 24,26. The impedance matching transformers 16,22 are configured such that it and its respective diode present the correct terminating impedance of 50 Ω when the diode is set to a selected forward biased state, hereinafter termed a detection state.

A parallel tuned circuit 36 is additionally connected to the interconnection 32 and comprises an inductor ($L_1$) 38 and capacitors ($C_2$) 40 and ($C_3$) 42. The inductor 38 and capacitor 40 are connected in series between the interconnection 32 and ground and the capacitor 42 is connected in parallel with the inductor 38. The value of the inductor 38 and capacitors 40, 42 are selected such that the tuned circuit 36 has a resonant frequency corresponding to an intermediate frequency (i.f.) which the circuit is intended to generate. In the embodiment described the desired i.f. frequency is 10.7 MHz.

The operation of the multimode transceiver circuit of FIG. 1 will now be described. The transceiver circuit has three modes of operation:
(i) as a sensitive AM detector which can be used for receiving a low/medium frequency AM radiation 6 "wake-up" signal;
(ii) as a frequency converter for down-converting received frequency modulated (FM) or phase modulated (PM) microwave radiation 6 to the desired i.f. signal $IF_{out}$; and
(iii) as a microwave transmitter for transmitting continuous or modulated microwave radiation 8.

The mode of operation of the circuit 2 is determined by the control circuit 14 and each mode is now described.

In the AM detection mode (i) the VCO 12 is switched off and presents a nominal 50 ohm terminating impedance at the port 10*d*. The bias voltage source 24 is switched such that the first Schottky diode 18 is in a low forward bias state (typically 3 μA), the detection state, and the bias voltage source 26 is switched such that the second Schottky diode 20 is in a zero bias or reverse biased state. AM microwave radiation 6 received at the antenna 4 is converted into an electrical signal which is applied to the port 10*a* of the coupler 10 which splits this signal equally such that it appears at the ports 10*b* and 10*c* in phase quadrature. Due to the impedance matching transformer 16 the diode 18 presents the correct terminating impedance to the port 10*b* ensuring maximum power is coupled to the diode 18. The diode 18 thus operates as a detector to detect modulation of the received signal which passes via the inductor 38 to produce a signal, $LF_{out}$, at an output 44 which comprises the interconnection between the inductor 38 and capacitor 40. The signal $FL_{out}$ is representative of the amplitude modulation of the radiation 6. It is to be noted that since the signals appearing at the ports 10*b*, 10*c* are in phase quadrature and the diodes 18 and 20 are oppositely orientated within the path between the ports 10*b* and 10*c*, their output signals would cancel if they were simultaneously operated as detectors i.e. if both diodes were in a low forward bias detection state. As a result in the AM detection mode one diode is in a zero or reverse bias state to quench its detection capability. It will be appreciated therefore that in the AM detection mode the diode 20 can alternatively be used as the detector and the diode 18 switched to a zero or reverse biased state. The detector diode 18 or 20 has good detection sensitivity due to its respective impedance matching transformer 16, 22 which ensures the maximum power is transferred from the coupler 10 to the diode. It will be appreciated that there is however an inherent loss of 3 dB in sensitivity due to the sharing of the input signal between the ports 10*b* and 10*c*. In the AM detection mode the circuit provides an ideal wake-up detector circuit which, upon detection of a low frequency AM wake-up signal, can be used to switch the remainder of the transponder circuit (not shown) from a low power, sleep state, to a fully powered operational state.

In the frequency conversion mode (ii) the VCO 12 is operable and both diodes 18, 20 switched to a low forward bias detection state such that each is well matched to its respective port. In this mode of operation the circuit functions as a balanced mixer such that the output appearing at the interconnection 32 is the difference frequency or i.f. between the carrier frequency of the received radiation 6 and the VCO 12. This i.f. signal, $IF_{out}$, which corresponds with the resonant frequency of the tuned circuit 36, passes to an output 46 to receiver circuitry (not shown) which utilises the i.f. signal to demodulate the received radiation 6. In this mode of operation the VCO 12 provides the local oscillator (LO) signal for down-conversion and this is set by the control circuit 14 to obtain the desired i.f. signal frequency. To maximise the performance of the circuit the diodes 18, 20 are preferably co-packaged devices though it will be appreciated that discrete devices can be used.

The impedance matching transformers 16,22 ensure that maximum power is transferred to the ports 10b and 10c, thereby maximising the isolation between the ports 10a and 10b and minimising leakage of the LO frequency from the port 10a. Since the diodes 18, 20 are impedance matched over the chosen operating bandwidth, non-linearity occurs at a relatively low incident power level, typically 10 µW, compared with conventional balanced mixer circuits. As a result efficient mixing and down-conversion occurs at relatively low local oscillator power levels, typically 10 µW. This is beneficial for minimising both power consumption and the level of LO signal radiated during receiver operation.

In the transmitting mode (iii) the VCO 12 is operable at the desired transmission frequency and both diodes 18 and 20 are forward biased at a relatively higher bias current, typically 1 mA, such that each tends towards a shorts circuit thereby upsetting the impedance match to their respective port 10b, 10c. Due to this terminating impedance mismatch the signal produced by the VCO 12, which had they matched would have been split between the ports 10b and 10c, is reflected back to the port 10a and to the antenna 2 where it is radiated as microwave radiation 8. Power reflected from the ports 10b and 10c is in phase at the port 10a and therefore adds constructively. Conversely the reflected power at the port 10d is in anti-phase and therefore cancels which provides a degree of reverse isolation at the port 10d. It will be appreciated that the circuit can also be operated as a transmitter with each diode 18, 20 is in either a zero or reverse biassed state. It is preferred however to operate the diodes in a forward conduction state to prevent self rectification effects which would absorb a part of the local oscillator power and reduce the transmitter efficiency.

The transmitted radiation 8 can be frequency modulated by operating the VCO 12 as an FM source. Alternatively the transmitted radiation 8 can be amplitude modulated by switching the transceiver circuit 2 between the transmitting and frequency conversion modes at the desired modulation frequency. In yet a further alternative arrangement the transmitted radiation 8 can be phase modulated by providing additional microwave circuitry between the VCO 12 and port 10d though this will increase the circuit complexity.

A particular advantage of the transceiver circuit 2 of the invention is its relative simplicity and its ability to efficiently operate in the three modes of operation making it an ideal RF front end transceiver circuit for incorporation into a transponder tag. As a result of the circuit's simplicity, its power consumption is considerably lower than that of the known transceiver circuits which have separate respective transmit, receive and AM detection circuits. Due to this low power consumption, typically a maximum of 40 µW (this being composed of the forward bias current for the diodes of 3 µA and the dc power to operate the VCO 12 of 30 µW), it is possible to operate a transponder tag incorporating the transceiver from a small battery source over a long operating life, typically of many years, without having to change the battery. Without the need to change the battery, it is preferred to incorporate the transceiver circuit as part of a totally sealed package to provide mechanical strength and protection against an environment.

Referring to FIG. 2 there is shown a further transceiver circuit 2 in accordance with the invention which uses a 0°/180° hybrid rat race coupler 10 and field effect transistors (FETs) 50,52 in place of the diodes 18, 20. For consistency like components have the same reference numerals. The coupler 10 preferably is constructed using microstrip line and has a characteristic impedance around its ring of 70.7 Ω with 50 Ω connecting lines providing the respective ports 10a–10d The arrows between the ports 10a–10d of the coupler 10 indicate the phase shift between them and the coupler 10 is such that a signal applied to the port 10a will be divided equally between ports 10b and 10c with a relative phase shift of 90° (270°–[90°+90°]). A gain no output appears at the port 10d since power travelling around the ring in an opposite direction has a relative phase shift of 180° at this port ([270°+90°]–[90°+90°]).

The FETs 50, 52, as did the diodes 18, 20, act as controllable non-linear impedances. Each FET 50,52 is configured by a respective bias network element 54,56 connected to its drains d and a controllable current sink 58, 60 connected to its source s such that its non-linear impedance can be controlled in dependence on its d.c. drain source current $I_{ds}$. The controllable current sinks 58, 60 are controlled in dependence on the control circuit 14 and are used to switch the current $I_{ds}$ to switch the FETs' impedance states. Respective impedance matching elements 62, 64 are provided at the source of each transistor 50, 52. Each transistor can be switched to operate as (i) a detector at low bias currents (typically $I_{ds}$~3 µA); (ii) a non-linear resistor in the mixer mode, and (iii) a linear negative resistance amplifier with controllable phase in the transmit mode.

In the embodiment shown in FIG. 2 the capacitor ($C_1$) 34, resistor (R1) 35 and parallel resonant circuit 36 are replaced by a transformer 66. The primary coil 68 of the transformer 66 is connected between the source electrodes s of the transistors 50, 52 and has a centre tap 70 from which the low frequency detected signal $LF_{out}$ is derived. One connection of the secondary coil 72 of the transformer 66 is connected to ground whilst the other connection of the coil provides the output 44 form which the intermediate frequency signal $IF_{out}$ is derived.

The operation of the circuit of FIG. 2 is in essence the same as that of the circuit of FIG. 1. In the AM detection mode the VCO 12 is switched off and both transistors 50, 52 switched by means of its respective current sink 58, 60 to operate at a low bias current, typically 3 µA, on anon-linear part of its transconductance curve, the detection state. Both transistors detect amplitude modulation of a signal applied to its gate g which are in antiphase. It is to be noted that since both transistors are connected in the circuit such that they have the same polarity, the detected signals appearing at their sources will have the same polarity and can be directly summed by the primary coil 68 to produce the output signal $LF_{out}$. At the comparatively low frequency of the detected signal the transformer primary 68 appears as a short circuit thereby summing the signals at the centre tap 70. An advantage of this circuit compared to the diode circuit of FIG. 1 is that both transistors are operated as detectors which makes more efficient use of the received radiation 6. In contrast in the diode circuit of FIG. 1 the polarity of the diode are opposite and hence the signals produced by the diodes are of opposite polarity and consequently in the detection mode only one diode is operable to prevent cancellation of the signals. The matching transformers 16, 18 are selected such that each transistor 50, 52 in presents the correct terminating impedance, 50 Ω to the respective port 10b, 10c of the coupler when it operated on the non-linear part of its transconductance curve to ensure maximum transfer of power from the respective port.

In the frequency conversion mode the VCO 12 is operable and both transistors are operated, by means of their respective current sinks 58, 60, on a higher current part of their transconductance curve. In this mode each transistor presents a non-linear resistance at the respective port of the coupler at the RF and LO frequencies. Both transistors 50,52 are still well matched to their respective port ensuring maximum power transfer to the respective FET 50, 52. In this mode the IF signals generated by each transistor are in anti-phase and are summed by the balancing transformer 66 which provides the required 0°/180° phase shift. As described the i.f. signal $IF_{out}$ is derived from the common output on the secondary coil 72.

In the transmitting mode the VCO 12 is operable and each FET 50, 52 is switched to operate at a relatively higher current region, typically 100 µA, of its transconductance curve such that each operates as a linear negative impedance, or reflection amplifier. Each transistor is set to have the same reflection coefficient though they are 180° out of phase, the phase being controllable in dependence on the magnitude of the negative resistance. Due to the negative impedance of the FET this upsets the impedance match at its respective port 10b, 10c and the signal from the VCO 12 which arrives at the ports 10b and 10c are reflected to the port 10a and to the antenna 4. At the port 10a the reflected signals are in phase and combine to produce the radiated energy 8. It will be further appreciated that the circuit of FIG. 2 can be operated to produce Binary Phase Shift Keyed (BPSK) radiation 8 by switching the transistors to different parts of their transconductance curve. For example transistor 50 can be operated to apply a 0° phase shift and transistor 52 to apply a 180° phase shift and BPSK modulation applied by switching the operation of the transistors to the opposite state.

In an alternative method of operation of the circuit of FIG. 2 in the frequency conversion mode, the two transistors are each be operated as non-linear negative resistance elements. Whilst such an arrangement improves the efficiency of mixing it has the drawback of reducing the isolation between the VCO 12 and port 10a resulting in some radiation of the local oscillator frequency from the antenna 4.

It will be appreciated that the present invention is not restricted to the specific embodiments described and that variations can be made which are within the scope of the invention. For example, whilst the use of diodes or FETs is preferred, any form of non-linear impedance or detector element can be used such as a voltage doubling diode detector connected to each port of the coupler. Furthermore, depending on the desired frequency of operation, other forms of four port couplers can be used such as rat-race, transformer hybrid, ring, or waveguide couplers. Moreover, whilst it is desirable to utilise the diode, transistor or other non-linear impedance device to operate as both a non-linear impedance and thus provide a detection capability and additionally to provide a switching capability between modes by providing a switchable impedance mismatch, this is not essential. In alternative arrangements therefore separate detection elements (non-linear impedance devices) and switchable terminating impedance or other switching means can be provided at the ports 10b and 10c.

What is claimed is:

1. A multimode transceiver circuit, comprising:
   a) a four port coupler for splitting an input signal into split signals which are phase shifted by a known amount, the coupler having a first port for receiving the input signal and for outputting an output signal therefrom;
   b) a controllable oscillator connected to a second port of the coupler;
   c) switchable impedances connected to the remaining ports of the coupler; and
   d) control means for controlling operation of the oscillator and the impedances such that:
      i) in one mode of operation, the oscillator is inoperative, and at least one of the impedances is switched to operate as a non-linear impedance to detect amplitude modulation of the input signal applied to the first port,
      ii) in a further mode of operation, the oscillator is operable, and the impedances are switched to operate as non-linear impedance elements to operate as a mixer to produce an intermediate frequency signal in dependence on the input signal applied to the first port, and
      iii) in yet a further mode of operation, the oscillator is operable, and the impedances are switched such that an oscillator frequency appears at the first port for transmission therefrom.

2. The transceiver circuit according to claim 1, in which the control means controls the switchable impedances by controlling a bias voltage applied thereto.

3. The transceiver circuit according to claim 1, in which at least one of the switchable impedances comprises a diode.

4. The transceiver circuit according to claim 1, in which at least one of the switchable impedances comprises a transistor.

5. The transceiver circuit according to claim 1, in which the split signals are phase shifted by zero and ninety degrees.

6. The transceiver circuit according to claim 1, in which the split signals are phase shifted by zero and one hundred and eighty degrees.

7. The transceiver circuit according to claim 1, in which the coupler comprises a branch arm coupler.

8. The transceiver circuit according to claim 1, in which the coupler comprises a rat race coupler.

9. The transceiver circuit according to claim 1, in which each mode of operation of the circuit is determined by an impedance match or mismatch of the switchable impedance to its respective port.

10. The transceiver circuit according to claim 1, in which in the yet further mode of operation, each impedance is switched such as to present an impedance mismatch to its respective port thereby reflecting a signal from the oscillator to the first port.

11. The transceiver circuit according to claim 10, and further comprising a fixed impedance element between the port and its respective switchable impedance, wherein the impedance of the fixed element is selected such that the switchable impedance is substantially matched to its respective port when it is operated as a non-linear impedance.

12. A tag incorporating a transceiver circuit comprising:
   a) a four port coupler for splitting an input signal into split signals which are phase shifted by a known amount, the coupler having a first port for receiving the input signal and for outputting an output signal therefrom;

b) a controllable oscillator connected to a second port of the coupler;
c) switchable impedances connected to the remaining ports of the coupler; and
d) control means for controlling operation of the oscillator and the impedances such that:
  i) in one mode of operation, the oscillator is inoperative, and at least one of the impedances is switched to operate as a non-linear impedance to detect amplitude modulation of the input signal applied to the first port,
  ii) in a further mode of operation, the oscillator is operable, and the impedances are switched to operate as non-linear impedance elements to operate as a mixer to produce an intermediate frequency signal in dependence on the input signal applied to the first port, and
  iii) in yet a further mode of operation, the oscillator is operable, and the impedances are switched such that an oscillator frequency appears at the first port for transmission therefrom.

* * * * *

UNITED STATES PATENT AND TRADEMARK OFFICE
CERTIFICATE OF CORRECTION

PATENT NO. : 6,895,226 B1
APPLICATION NO. : 10/130442
DATED : May 17, 2005
INVENTOR(S) : Ian J. Forster et al.

It is certified that error appears in the above-identified patent and that said Letters Patent is hereby corrected as shown below:

| COLUMN | LINE | ERROR |
| --- | --- | --- |
| Title Page item 57 | 14 | "amplitude-modulation" should read --amplitude modulation-- |
| 2 | 10 | "therefrom:" should read --therefrom;-- |
| 2 | 36 | "aim," should read --arm,-- |
| 3 | 31 | "Ia," should read --$10a$,-- |
| 3 | 42 | "28,30" should read --28, 30-- |
| 3 | 55 | "signal. i.e." should read --signal, i.e.-- |
| 3 | 58 | "24,26." should read --24, 26.-- |
| 3 | 59 | "16,22" should read --16, 22-- |
| 5 | 11 | "16,22" should read --16, 22-- |
| 5 | 63 | "de power" should read --dc power-- |
| 6 | 7 | "50,52" should read --50, 52-- |
| 6 | 16 | "A gain" should read --Again,-- |
| 6 | 21 | "50,52" should read --50, 52-- |
| 6 | 22 | "54,56" should read --54, 56-- |
| 6 | 33 | "mode, and" should read --mode; and-- |
| 6 | 49 | "anon-linear" should read --a non-linear-- |

UNITED STATES PATENT AND TRADEMARK OFFICE
CERTIFICATE OF CORRECTION

PATENT NO.        : 6,895,226 B1
APPLICATION NO.   : 10/130442
DATED             : May 17, 2005
INVENTOR(S)       : Ian J. Forster et al.

It is certified that error appears in the above-identified patent and that said Letters Patent is hereby corrected as shown below:

| COLUMN | LINE | ERROR |
|---|---|---|
| 7 | 11 | "50,52" should read --50, 52-- |
| 7 | 16 | "arc" should read --are-- |

Signed and Sealed this

Sixteenth Day of June, 2009

JOHN DOLL
*Acting Director of the United States Patent and Trademark Office*